United States Patent [19]
Norton et al.

[11] Patent Number: 5,898,688
[45] Date of Patent: Apr. 27, 1999

[54] ATM SWITCH WITH INTEGRATED SYSTEM BUS

[75] Inventors: Kenneth Norton; Mark Rumer, both of Santa Barbara, Calif.

[73] Assignee: Cisco Technology, Inc., San Jose, Calif.

[21] Appl. No.: 08/653,259

[22] Filed: May 24, 1996

[51] Int. Cl.$^6$ ................................................. H04L 12/56
[52] U.S. Cl. .......................... 370/362; 370/395; 370/473
[58] Field of Search ..................................... 370/390, 395, 370/396, 397, 398, 412, 414, 416, 474, 362, 473, 382, 392; 395/200.8, 200.68

[56] References Cited

U.S. PATENT DOCUMENTS

| | | | |
|---|---|---|---|
| 5,371,424 | 12/1994 | Quigley et al. | 326/63 |
| 5,446,726 | 8/1995 | Rostoker | 370/395 |
| 5,452,330 | 9/1995 | Goldstein | 370/395 |
| 5,563,542 | 10/1996 | Watarai | 327/382 |
| 5,602,853 | 2/1997 | Ben-Michael et al. | 370/474 |
| 5,610,921 | 3/1997 | Cristensen | 370/474 |
| 5,619,500 | 4/1997 | Hiekali | 370/396 |
| 5,666,351 | 9/1997 | Oksanen et al. | 370/474 |
| 5,668,812 | 9/1997 | Akiyoshi | 370/474 |
| 5,726,985 | 3/1998 | Daniel et al. | 370/382 |
| 5,734,656 | 3/1998 | Prince et al. | 370/395 |

*Primary Examiner*—Chau Nguyen
*Attorney, Agent, or Firm*—Blakely Sokoloff Taylor & Zafman, LLP

[57] ABSTRACT

A network switch includes a plurality of cell processing units coupled together via a switch bus. In a preferred embodiment, the switch bus supports the peripheral component interconnect (PCI) bus protocol. Each cell processing unit includes a segmentation and reassembly unit (SAR), a RISC processor, a port processor, and a bus control unit. The SAR generates cells from frames of data stored in memory and transfers those cells to a destination mailbox in response to commands from from the RISC processor. The SAR assembles a cell within an internal register by combining cell header information with payload data read from memory. Once a cell has been assembled, it is sent to the bus controller for transmission across the switch bus to an address given by a mailbox number. Cells are transferred across the switch bus using a PCI burst write to the mailbox. A reassembly function gathers 48-byte cells into one or more larger output buffers. Cell reassembly is triggered by another RISC processor command. During reassembly, cell header information is discarded and the data payload bytes are read to an internal buffer within the SAR. The payload data is then written to a memory location pointed to by a buffer memory pointer. The switch bus 14 is also used for the transfer of control information between configuration registers of the cell processing units 12.

10 Claims, 13 Drawing Sheets

ATM SWITCH WITH INTEGRATED SYSTEM BUS

FIELD OF THE INVENTION

The present invention relates to cell switching network communications and, more particularly, to a switch architecture that provides a common bus for switching ATM cells and switch control data.

BACKGROUND

The desire to integrate data, voice, image and video over high speed digital trunks had led to the development of a packet switching technique called cell relay or asynchronous transfer mode. A typical fully integrated voice and data network using digital trunk lines includes a number of geographically distant interconnected switches. Each switch acts as a cell exchanger for receiving and forwarding cell information to its destination. By the use of a variety of interface cards, each switch is capable of interfacing to user generated voice and data streams, then segmenting and assembling the streams into a more efficient cell format for transmission over a closed network using digital lines. Each switch is also capable of receiving data from other network nodes and forwarding that data through to other network switches to its ultimate destination. All terminal switches also provide the necessary interface cards required to reassemble the data contained in the cells into standard user data stream formats.

In general, each ATM switch in the network comprises a switching fabric and a plurality of ports. The ports are coupled to various input and output lines and act as interfaces for relaying the ATM cells. The switching fabric couples the various ports to one another, thereby allowing for the routing of ATM cells within the switch. The switching fabric typically includes a number of processors and other controllers, all of which need to communicate with one another. To accommodate this arrangement, ATM switches generally employ two system wide buses: a cell bus, and a control bus.

The cell bus is generally a high speed bus used for switching cells between ports. The control bus transports data and control information between the various processors and port controllers within the switch. This arrangement of two distinct buses, one for cell switching and one for passing control and data between the switch processors, leads to increased costs and complexity for ATM switches. Therefore, it would be desirable to integrate the transfer of ATM cells and inter-processor communications within a single system bus in an ATM switch.

SUMMARY OF THE INVENTION

It is therefore an object of the present invention to provide an ATM switch which uses a single internal bus to support cell switching and the transfer of control information between the various port controllers within the switch.

This and other features of the present invention are provided in a network switch comprising of a plurality of ATM cell processing units. Each cell processing unit includes a segmentation and reassembly unit (SAR), a RISC processor, a port processor, and a bus control unit The SAR generates cells from frames of data stored in memory and transfers those cells to a destination mailbox in response to commands from from the RISC processor. The SAR assembles a cell within an internal register by combining cell header information with payload data read from memory. Once a cell has been assembled, it is sent to the bus controller for transmission across the switch bus to an address given by a mailbox number. Cells are transferred across the switch bus using a PCI burst write to the mailbox. A reassembly function gathers 48-byte cells into one or more larger output buffers. Cell reassembly is triggered by another RISC processor command. During reassembly, cell header information is discarded and the data payload bytes are read to an internal buffer within the SAR. The payload data is then written to a memory location pointed to by a buffer memory pointer. The switch bus is also used for the transfer of control information between configuration registers of the cell processing units.

DETAILED DESCRIPTION

An ATM switch based on an integrated system bus is described. According to one embodiment, the switch comprises a plurality of ATM cell processing units, each having a segmentation and reassembly unit and a bus interface unit. The individual cell processing units 12 are coupled together via a common integrated bus. The integrated bus supports the transfer both ATM cells and control information between cell processing units.

I. Overview

Figure 1:
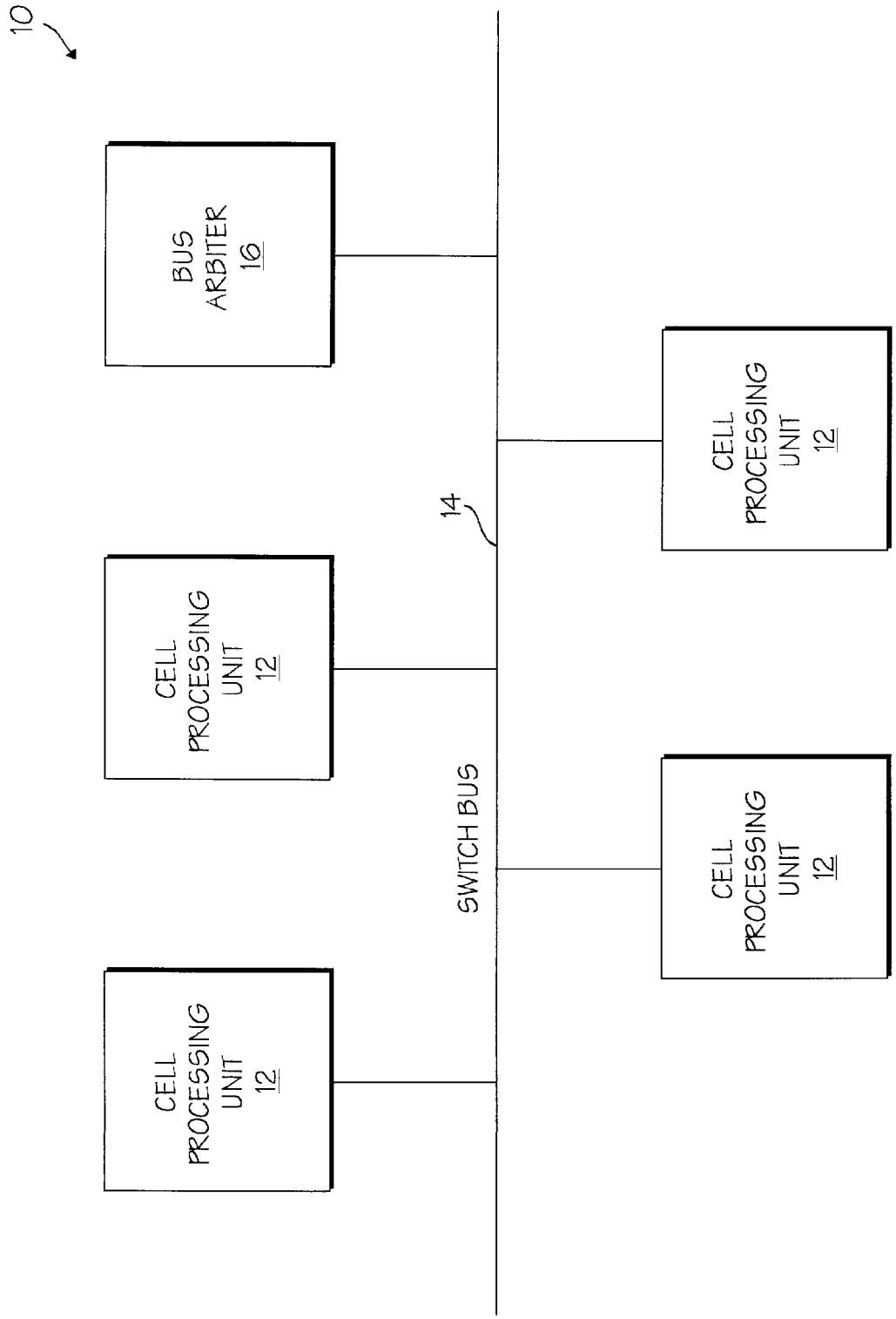
FIG. 1 shows an ATM switch having an integrated cell bus and control bus according to one embodiment.

FIG. 1 shows an ATM switch 10 incorporating the features and methods of the present invention. The switch 10 includes a number of ATM cell processing units 12 coupled together via integrated switch bus 14. The switch 10 also includes bus arbiter 16 which is also coupled to switch bus 14. As further described below, each ATM cell processing unit 12 contains the logic, memory and processing elements required for cell segmentation, reassembly and transmission over switch bus 14. One or more cell processing units 12 is/are associated with one or more ports (not shown) for receiving and transmitting ATM cells across an ATM network of which switch 10 is one node.

The ATM cell processing units 12 use switch bus 14 to transfer cells between one another (for example, when switching cells between ports) and to send and receive switch control information. For a preferred embodiment, switch bus 14 supports the Peripheral Component Interconnect (PCI) bus protocol. As known in the art, the PCI bus protocol allows the transfer of single data items and burst transfers of any length. In general, switch control information is transferred across switch bus 14 as single data items while ATM cells are passed in burst transfers. The manner in which the burst transfers are supported is more fully described below.

Bus arbiter 16 controls access to switch bus 14. When an ATM cell processing unit 12 needs to access the switch bus 14, the cell processing unit 12 asserts a bus request signal. Bus arbiter 16 receives the bus request signal and, if appropriate, transmits a bus grant signal in return. When the cell processing unit 12 sees the bus grant signal, the cell processing unit 12 transmits its data (cells or control information) across switch bus 14 to a destination address.

Figure 2:
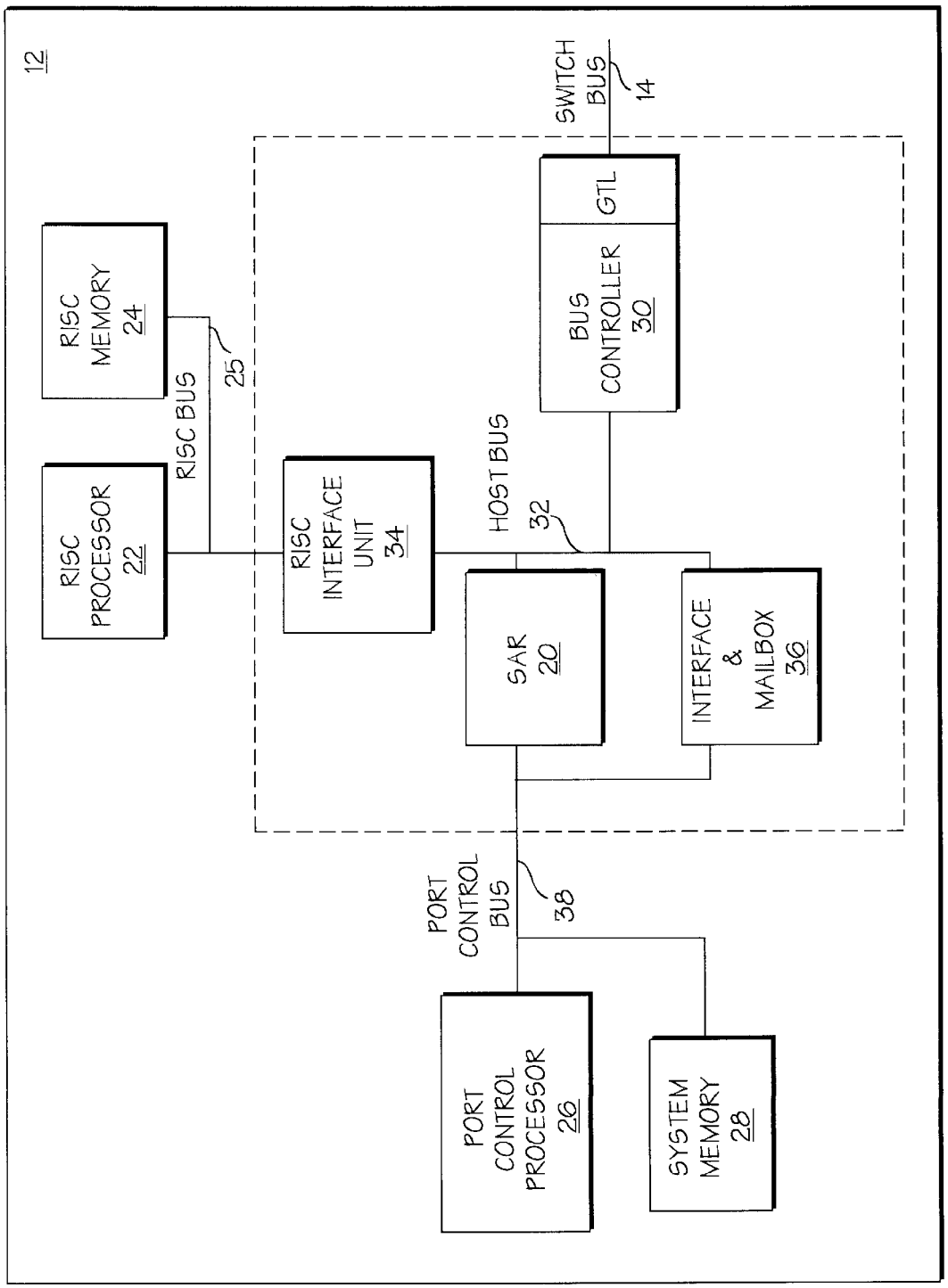
FIG. 2 shows a block diagram of an ATM cell processing unit according to one embodiment.

The cell processing units 12 of FIG. 1 are substantially similar in design. As shown in FIG. 2, each cell processing unit 12 includes a segmentation and reassembly (SAR) unit 20, a reduced instruction set (RISC) processor 22 with an associated RISC memory 24, a port control processor 26 with an associated system memory 28, and a bus controller 30. The RISC processor 22 is coupled to the RISC memory via RISC bus 25. The RISC memory stores computer readable instructions which, when executed by RISC processor 22, cause RISC processor 22 to, among other things, control the segmentation and reassembly operations described below. The SAR unit 20 is coupled to the bus controller 30 via an internal host bus 32. The bus controller 30 acts as an interface between the cell processing unit 12 and the switch bus 14. The SAR unit 20 is coupled to the RISC processor 22 via a RISC interface unit 34. The port control processor 26 is coupled directly to the SAR unit 20 and to the bus controller 30 via an interface and mailbox unit 36. The port control processor 26 is coupled to the system memory 28 via a port control bus 38. The interface and mailbox unit 36 allows the port control processor to access the switch bus 14 to send and receive port control information. The interface and mailbox unit 36 also participates in the exchange of ATM cells between cell processing units 12 within switch 10 as more fully described below.

Each cell processing unit 12 supports various functions. A segmentation function is responsible for "chopping up" larger frames of data into 64-byte cells. SAR unit 20 creates a cell whenever it receives a request for a cell from the RISC processor 22 for a connection. This request is made by writing a connection number to a register. Each time a cell is completed, the SAR unit 20 returns a completion status to the RISC processor 22 via the register.

The SAR unit 20 uses the connection number transferred by RISC processor 22 as an index into a connection table. The connection table is stored in system memory 28 and contains the information needed to create a cell for a specified connection. This includes a buffer memory address that points to the next word of payload data to be transmitted, a count of the number of bytes of data remaining in the buffer, any previous state information needed for his connection in order to process the next cell correctly, error detection information, a cumulative count of the number of bytes processed in the frame, cell header information which will be sent before the payload data, and the mailbox (i.e., destination) address that the cell is to be sent to.

The SAR unit 20 assembles a cell within an internal register by combining the cell header information with 48 bytes of payload data read from the buffer memory address and accumulates a CRC across the payload. Once a cell has been assembled in the internal register, it is then sent to the bus controller 30 for transmission across the switch bus 14 to the address given by the mailbox number. The SAR unit then updates the connection table entries. After the cell has been successfully transmitted, a completion status will be queued for the specified connection for the RISC processor 22 to read and the next request from the RISC processor 22 will be processed.

A reassembly function gathers 48-byte cells into one or more larger output buffers while performing an error check on the data. A cell reassembly is triggered by the RISC processor 22 writing a connection number to a register within SAR unit 20. The connection table used in the segmentation and transfer operation is also used by the reassembly function. The connection table contains a cell memory pointer and a buffer memory pointer. The cell memory pointer specifies the beginning address of a sixty-four byte cell that was received across switch bus 14. The buffer memory pointer specifies the beginning address of a buffer to put the data in.

During reassembly, the cell header information is discarded, except that the header information is checked to determine if the cell is the last in a frame. The 48 data bytes in the payload are read to an internal buffer within SAR unit 20 with the error detection information being checked. Each cell buffer contains a pointer to the next cell in memory. Thus, the reassembly function can follow the lined list of cells to assemble the original frame of data.

The payload data now residing in an internal data buffer in SAR unit 20 is then written to the memory location pointed to by the buffer memory pointer. After the last cell has been processed, the error detection information is checked and a good or bad status is returned for the full frame to the RISC processor 22. The connection table is then updated.

As indicated, each ATM cell processing unit 12 contains 32 "mailboxes" in system memory 28 in which incoming cells from the switch bus 14 can be stored. The mailbox unit 36 in the ATM cell processing unit 12 contains a 64-byte buffer to temporarily hold the incoming cell, and 32 mailbox pointers which contain the corresponding system memory 28 addresses of the mailboxes. Cells are transferred across switch bus 14, in one embodiment, using a PCI burst write to a mailbox (i.e., a destination address). The sixty-four byte burst of data is written at the address contained in a Cell Buffer Pointer Register for that mailbox. Once the cells have been stored in system memory 28, they will either be reassembled into frames or converted to standard 53-byte ATM cells for transmission across an ATM network of which switch 10 is one node.

Within a switch 10, for a preferred embodiment, the ATM cell processing units 12 communicate with each other using the PCI bus protocol over a backplane (i.e., switch bus 14). The PCI bus protocol is implemented in the bus controller 30 of each ATM cell processing unit 12. However, even though the PCI bus protocol is used, the standard PCI bus TTL electrical interface is not satisfactory due to the length of the switch backplane (approximately 12 inches in one embodiment). For this reason, the PCI bus signals on the backplane utilize Gunning Transceiver Logic (GTL) drivers and receivers. As known by those skilled in the art, GTL is specifically intended for wide, high-speed backplanes. Bus controller 30 includes the required GTL drivers and receivers.

Using the PCI bus protocol for the switch bus 14 provides two advantages. First, the PCI bus protocol has a multi-master capability, second, the protocol has the ability to burst multiple 32-bit words of data across the bus 14 in a single bus transaction. Having multi-master capability means that any ATM cell processing unit 12 in the switch 10 can request control of the bus 14 and, once control is granted by bus arbiter 16, the cell processing unit 12 can send data directly to any other cell processing unit 12. The burst capability is utilized extensively in switch 10 to move 64-byte cells of data between cell processing units 12, as indicated above.

The switch bus 14 is also used for the transfer of control information between the configuration registers of the cell processing units 12. In accordance with the PCI bus protocol, each ATM cell processing unit 12 has an associated configuration space defined. Registers in configuration space are accessed by the RISC processor 22 and the port control processor 26 through the use of a configuration address register and a configuration data register in the register space of each ATM cell processing unit 12. When the data register is accessed, it causes a configuration access on the switch bus 14 to the address in the configuration address register.

The main functional blocks that make up the cell processing unit 12 and the data structures that are used are now described in detail.

II. Segmentation and Reassembly

Figure 3:
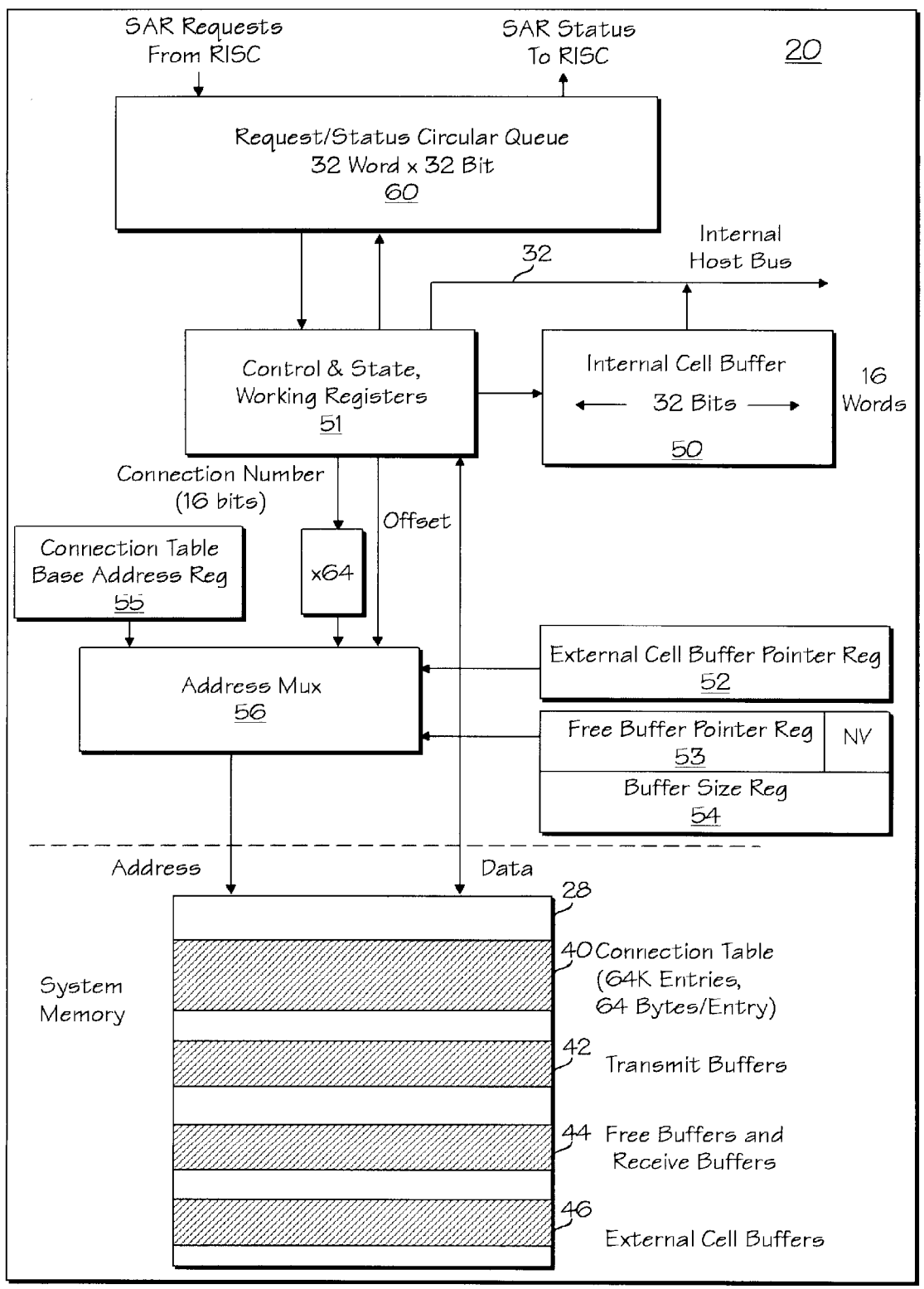
FIG. 3 shows a block diagram of the segmentation and reassembly unit of an ATM cell processing unit according to one embodiment.

The segmentation function segments frames into 64-byte cells for transmission over the switch bus 14 while the reassembly function processes cells received from the switch bus 14 back into frames. A block diagram of the SAR unit 20 of the cell processing unit 12 is shown in FIG. 3. The dashed line indicates that system memory 28 is not physically part of SAR unit 20, but is part of the unit's functional layout. SAR unit 20 includes an internal cell buffer 50 which is coupled to internal host bus 32. As described below, internal cell buffer 50 is used to format a cell prior to transmission across switch bus 14. SAR unit 20 also includes various control and state registers 51, an external cell buffer pointer register 52, a free buffer pointer register 53, a buffer size register 54, a connection table base address register 55, and an address multiplexer (mux) 56. The operation and use of these registers is described below in connection with a discussion of the segmentation function. SAR unit 20 further includes a request and status circular queue 60 which is used as a FIFO register to pass segmentation and reassembly instructions and status from/to RISC processor 22 via RISC interface unit 34.

As seen by SAR unit 20, system memory 28 is divided into various sections, including a connection table 40, one or more transmit buffers 42, one or more receive buffers 44, and one or more external cell buffers 46. The use of these buffers is described below.

Figure 4:
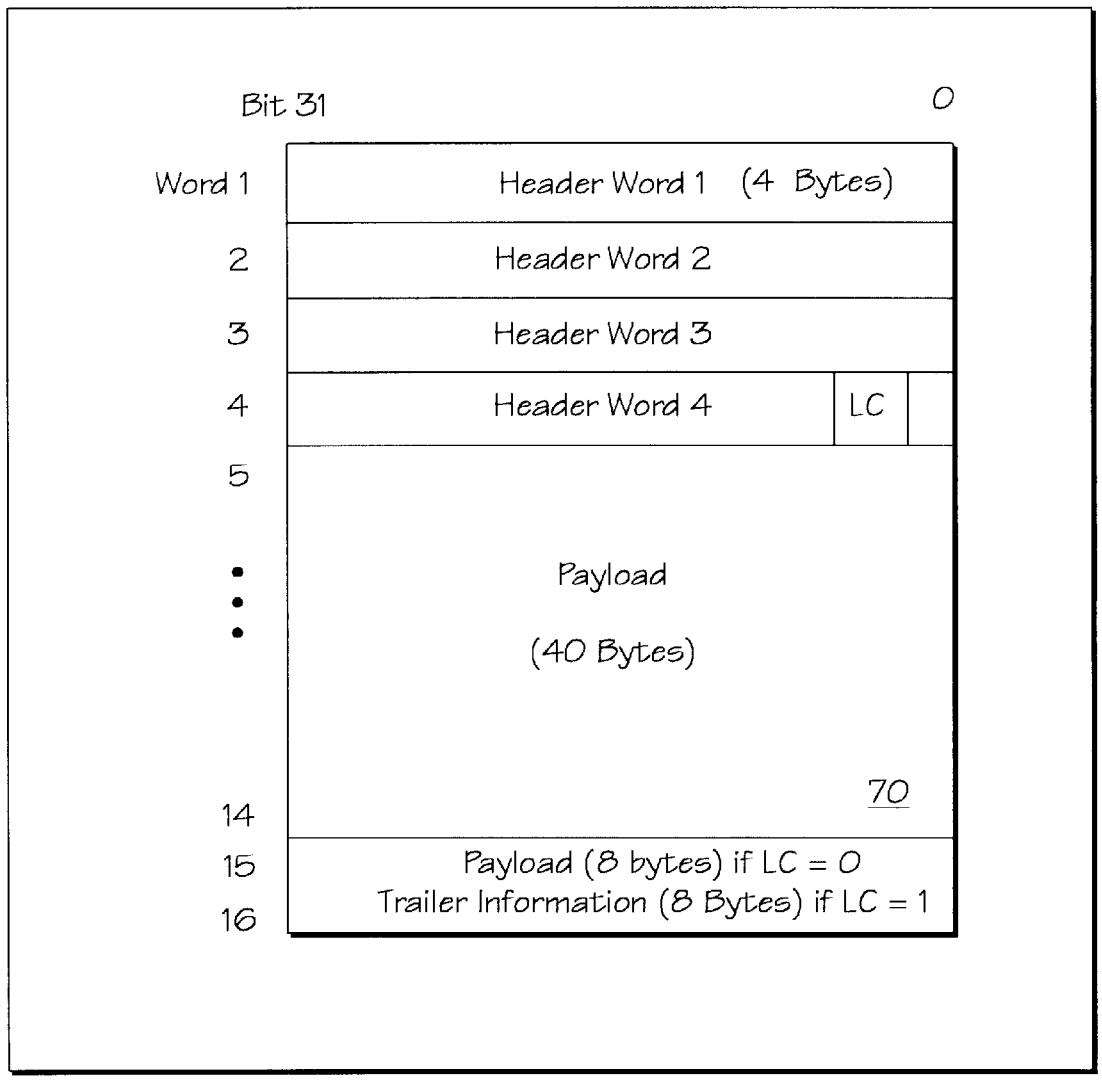
FIG. 4 shows a typical cell format.

In general, data will need to be switched between various ATM cell processing units 12 within switch 10. This is accomplished by "choping up" or segmenting the data into cells 70 and transferring the cell 70 across switch bus 14, between cell processing units 12. The format of a cell 70 is shown in FIG. 4. The cells 70 that are transferred across the switch bus 14 consist of 16 4-byte words, for a total of 64 bytes. At the beginning of the cell 70 are 16 bytes (4 words) of header information. The remaining 48 bytes of the cell 70 either contain 48 bytes of payload or, if the cell is the last one for a frame, contains 40 bytes of payload and 8 bytes of trailer information.

The header information to be placed in the cell 70 is read from an entry in the connection table 40 in system memory 28 as described below. The only bit that is manipulated by the SAR unit 20 is the Last Cell (LC) bit (Header Word 4, Bit 1) which, when set, indicates that this is the last cell for a frame.

Figure 5:
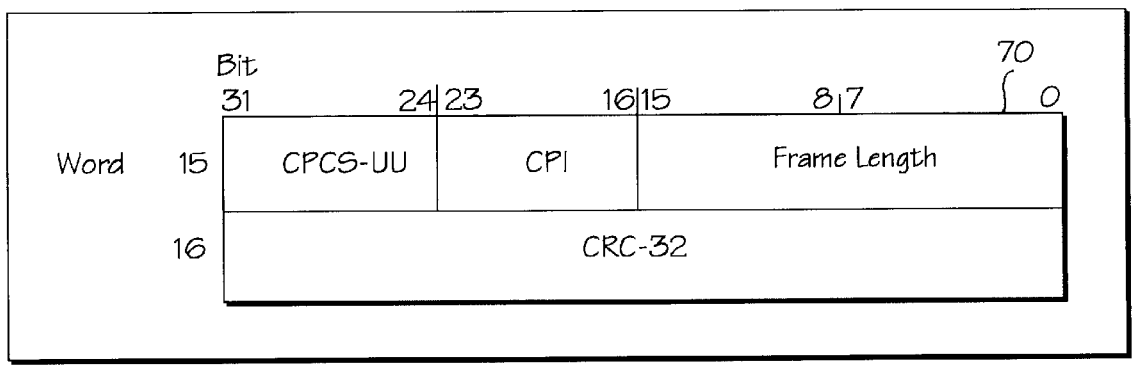
FIG. 5 shows a cell trailer format.

If a cell 70 is not the last one for a frame, the last two words (8 bytes) of the cell 70 will contain payload information. If the cell 70 is the last one for a frame, the last two words will contain trailer information. When the last two words contain trailer information, they have the format shown in FIG. 5.

The two trailer words are located in words 15 and 16 of the last cell 70 for a frame, leaving 10 words (40 bytes) available in the last cell 70 for payload data. Depending on the actual number of remaining bytes in the frame, an additional cell 70 may need to be added to complete the frame. The possible conditions are shown in Table 1.

TABLE 1

Generation of Last Cell for a Frame

| Number of Data Bytes Remaining in Frame | Action |
|---|---|
| 0 | Words 5 through 14 are padded with bytes of zeroes, added in Words 15 and 16. This cell is marked as last cell of the frame and is sent to the switch bus for |
| 1–39 | The data bytes are inserted in the cell starting at Word 5, Bits 31–24. The remaining unused bytes through the end of Word 14 are padded With bytes of zeros. The trailer is added in Words 15 and 16. This cell is marked as the last cell of the frame and is sent to the switch bus for transmission. |
| 40 | The data bytes are inserted in Words 5 through 14, the trailer is added in Words 15 and 16. This cell is marked as the last cell of the frame and is sent to the switch bus for transmission. |
| 41-47 | The data bytes are inserted in the cell starting at Word 5, Bits 31–24. All remaining bytes in the cell are padded with zeroes. This is NOT the last cell of the frame. Another |

TABLE 1-continued

Generation of Last Cell for a Frame

| Number of Data Bytes Remaining in Frame | Action |
| --- | --- |
| | cell will be generated with 0 data bytes remaining in the frame - refer to the first entry in this table. |
| 48 | Words 5 through 16 are loaded with data. This is NOT the last cell of the frame. Another cell will be generated with 0 data bytes remaining in the frame - refer to the first entry in this table. |

Figure 6:
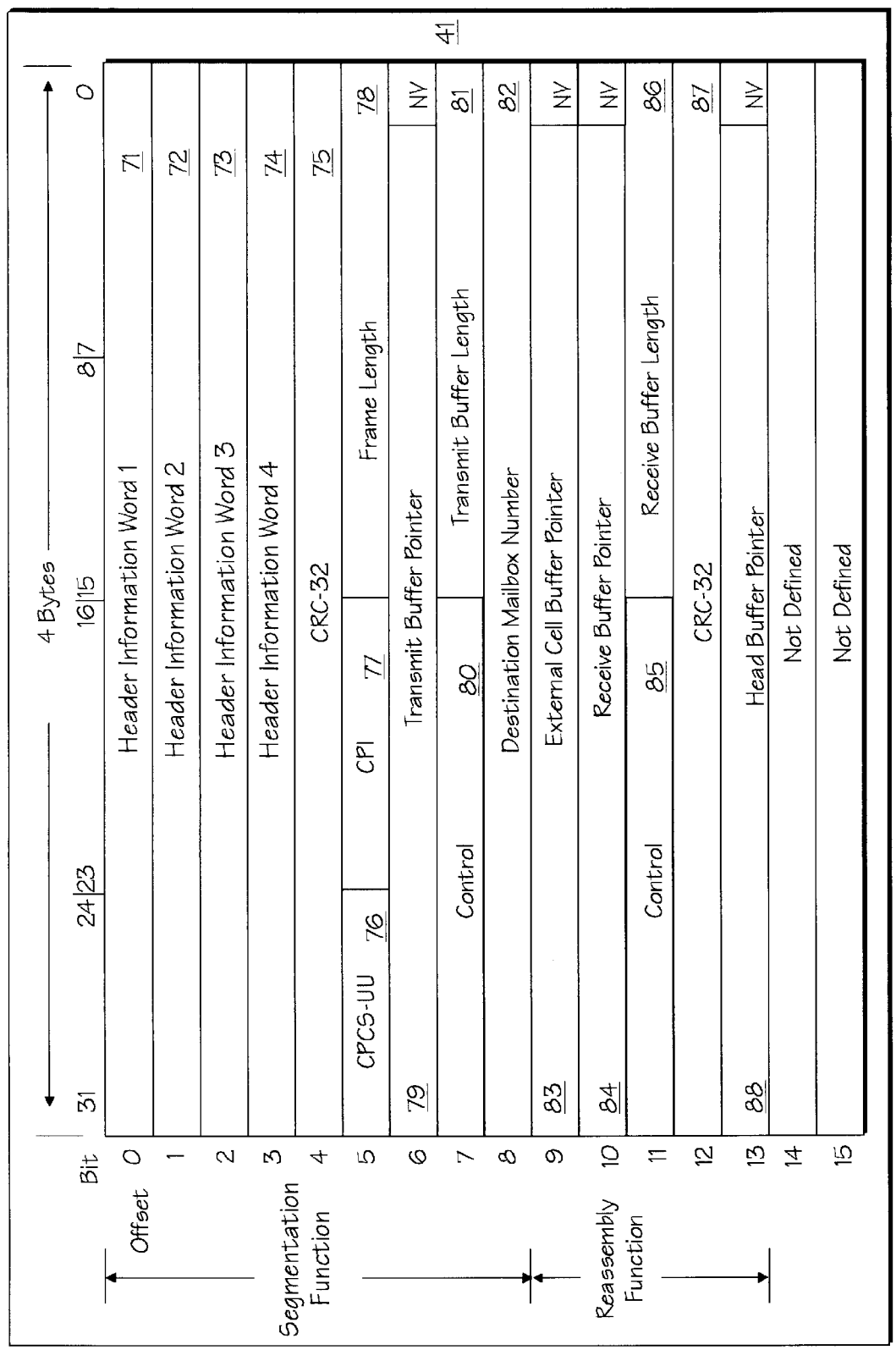
FIG. 6 shows a typical connection table according to one embodiment.

When the last cell 70 of a frame is generated, the CPCS-UU and CPI bytes (see FIG. 5) are copied directly from the appropriate entry in the connection table 40 (see FIG. 6). The Frame Length is the total number of data bytes in the frame, not including any padding bytes or trailer bytes. Included in the CRC-32 calculation are all the data in the frame, all bytes of padding, and the first word of the trailer (Word 15).

To process a cell 70, the segmentation and reassembly functions of SAR unit 20 need to access information in the connection table 40 which is stored in system memory 28. The connection table 40 contains 64K entries, for one embodiment. Each entry in the connection table 40 is 64 bytes; the format of an entry 41 is shown in FIG. 6.

With one exception, Header Words 1 through 4, 71–74, of the entry 41 are copied unchanged by the segmentation function into the header of an outgoing cell. The one exception, as noted above, is that the segmentation function will alter Header Word 4, 74, Bit 1, in the cell header to indicate whether the cell 70 is the final cell in a frame. The four Header Words 71–74 are defined and maintained by system software.

The segmentation function uses the CRC-32 location 75 to store intermediate values of the 32-bit CRC while it is being calculated over cells 70 that make up the frame. In one embodiment, his word is initialized to all ones at power up. The segmentation function will set this word to all ones after the last cell in a frame is processed.

The CPCS-UU 76 and CPI 77 bytes are copied unchanged by the segmentation function from the connection table entry 41 into the trailer of the final cell 70 of a frame. These bytes are defined and maintained by system software.

The two bytes for Frame Length 78 contain a count of the number of bytes in the frame that have been processed by the segmentation function. The count is updated as each cell 70 is processed. When the last cell 70 in a frame is processed, the final frame length is determined and loaded into the trailer of the cell 70. As noted above, the frame length does not include any padding or trailer bytes. For one embodiment, the Frame Length field 78 is initialized to zeroes at power up. After the last cell 70 in a frame has been processed, the segmentation function will reset the Frame Length field 78 to all zeroes.

The Transmit Buffer Pointer 79 points to the next word to be processed in the transmit buffer 42. The segmentation function reads data from the transmit buffer 42 as it is processing cells 70 and updates the value of the pointer 79 accordingly. Bit 0 of this word is the Not Valid (NV) Bit. If the NV bit is set to 1, the pointer 79 is invalid. For one embodiment, the NV Bits in all connection table entries 41 are initialized to 1 at power up. After system software has placed a valid buffer pointer 79 in this word, the NV bit is reset to 0; system software only writes into this word when the NV Bit is set to 1.

The Control field 80 is used for storage of control and state information by the segmentation function.

The Transmit Buffer Length field 81 contains the number of bytes remaining to be processed in the current transmit buffer 42 by the segmentation function. The segmentation function updates this field as the cells 70 are being processed. In one embodiment, the Transmit Buffer Length field 81 is initialized to zero at power up. Software will set the value of the Transmit Buffer Length field 81 to the actual length in bytes of the transmit buffer 42 when it processes the connection table 40 entry.

The Destination Mailbox Number word 82 is loaded by software and contains the switch bus 14 address of the destination mailbox for the connection.

The final two words in a connection table entry 41 may be used for whatever purpose system software deems appropriate.

Figure 7:
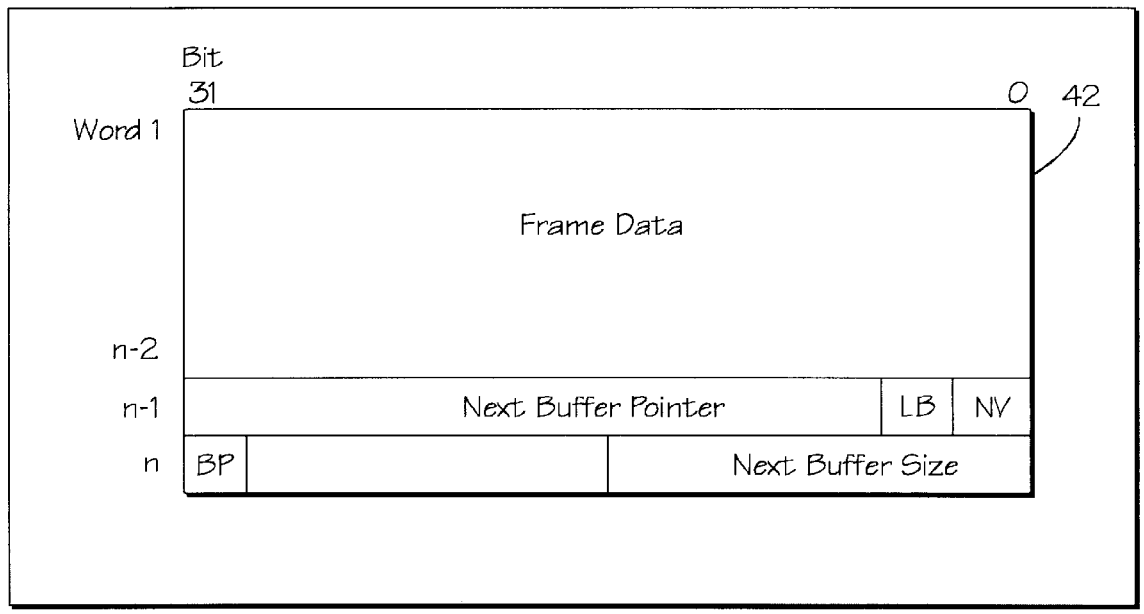
FIG. 7 shows a transmit buffer for an ATM cell processing unit according to one embodiment.

A frame of data to be transmitted is stored in system memory 28 in one or more transmit buffers 42. The format of a transmit buffer 42 is shown in FIG. 7. The transmit buffers 42 are allocated by software which stores the beginning address and initial size of the transmit buffer 42 in the appropriate entries 41 (at Transmit Buffer Pointer 79 and Transmit Buffer Length 81, respectively) in the connection table 40. The initial size of the transmit buffer 42 that is stored in the connection table entry 41 (Transmit Buffer Length 81) indicates the amount of frame data present in the buffer 42, it does not include the final two words of the buffer 42. Unless it is the last buffer for a frame, the size of the buffer 42, for one embodiment, is a multiple of 4 bytes and starts on a word (32-bit) boundary.

In order to allow for chaining of transmit buffers 42, the last two words of the buffer 42 are reserved for the address and size of the next buffer 42 and several status bits. The Next Buffer Pointer, Last Buffer for frame (LB) and Not Valid (NV) Bits, and Next Buffer Size field are all initialized to the appropriate values by software. For one embodiment, the Buffer Processed (BP) Bit is initialized to 0 by software. When the buffer 42 has been processed, the BP Bit is set to 1.

Figure 8:
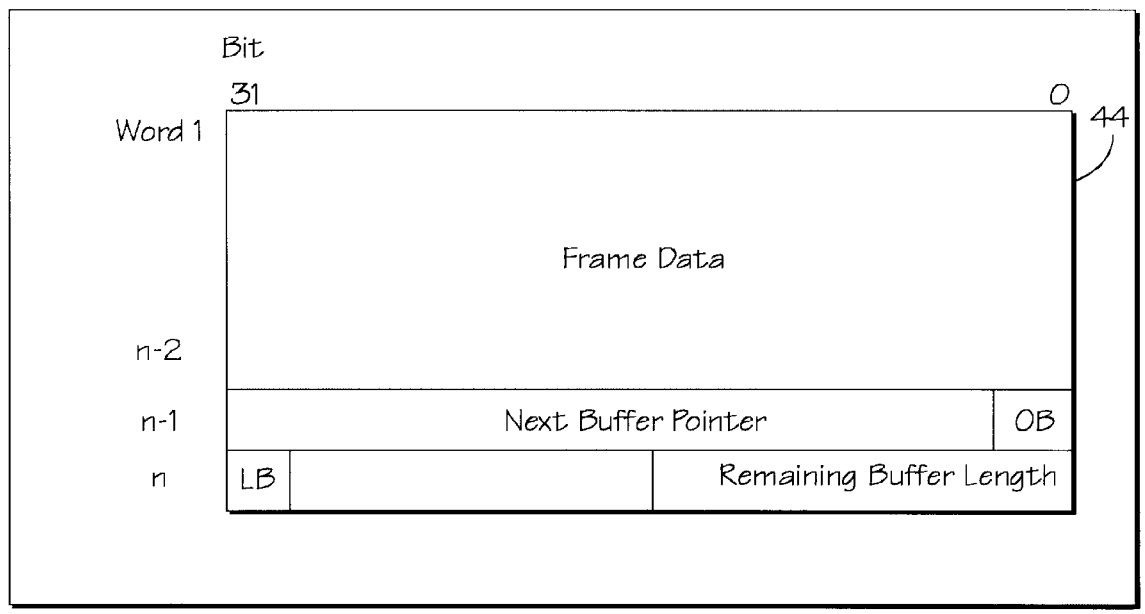
FIG. 8 shows a receive buffer for an ATM cell processing unit according to one embodiment.

FIG. 8 shows the format of a receive buffer 44. After cells 70 for a given connection are received, they are reassembled into frames using one or more receive buffers 44 located in system memory 28. Software will build a chain of free buffers at initialization and place the address of the first buffer in the Free Buffer Pointer Register 53 (FIG. 3). It will also place the size of the buffers 44 in the Buffer Size Register 54. For one embodiment, all receive buffers 44 are the same size and are integer multiples of 48 bytes. The size of the buffer placed in the Buffer Size Register 54 refers to the amount of Frame Data to be transferred into the buffer 44 from cells 70 and does not include the last two words (8 bytes) of the buffer 44.

Figure 9:
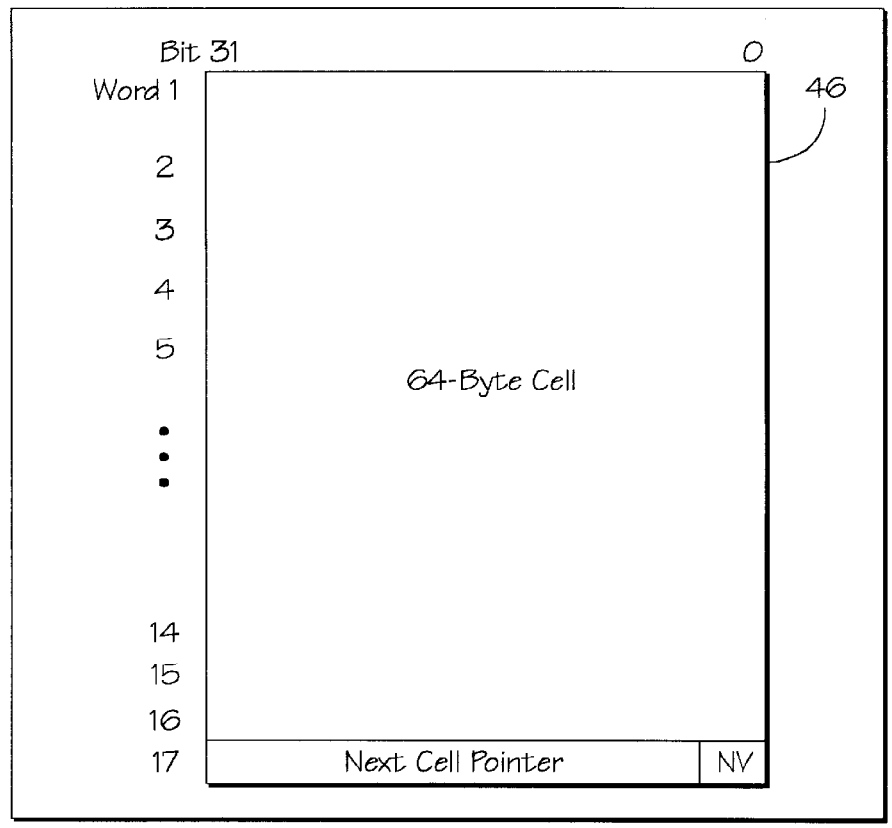
FIG. 9 shows an external cell buffer for an ATM cell processing unit according to one embodiment.

FIG. 9 shows the format of an external cell buffer 46. When cells 70 are received from the switch bus 14 for a particular connection, they are stored in system memory 28 as a linked list of external cell buffers 46. Each external cell buffer 46 is 68 bytes in length to accommodate the 64-byte cell and 4 bytes of next address information. (These buffers are referred to as external because they are in system memory 28, external to the SAR unit 20. These should not be confused with the single cell buffer 50 that is internal to the SAR unit 20.)

Figure 10:
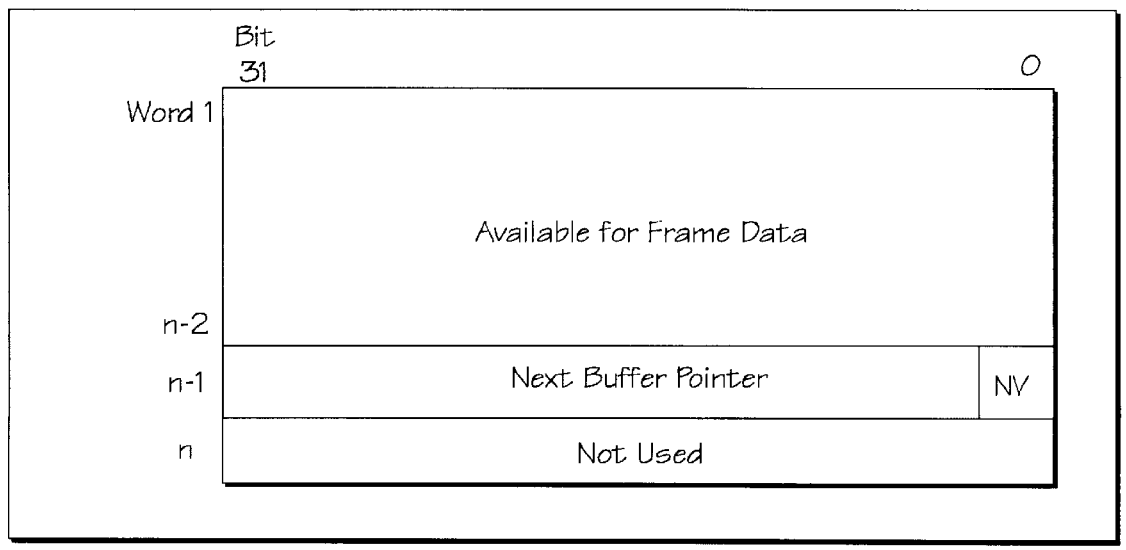
FIG. 10 shows a free buffer list entry according to one embodiment.

FIG. 10 shows the format of an entry in the Free Buffer List. The Free Buffer List is a linked list of buffers available to the reassembly function. All of the buffers in the list are of the size indicated in the Buffer Size Reg. 54 in the SAR unit 20. The Free Buffer Pointer Reg. 53 in the SAR unit 20 contains the address of the first buffer in the list. Note that the Buffer Size Reg. 54 gives the number of bytes of payload data that the buffer can hold and does not include the last word of the buffer which is the chaining information to the next buffer.

The segmentation and reassembly of cells is performed at the direction of the RISC processor 22. Requests for segmentation and reassembly are written by the RISC processor 22 into the Request/Status Circular queue 60, and the status of those requests are read by RISC processor 22 from the same queue 60.

Figure 11:
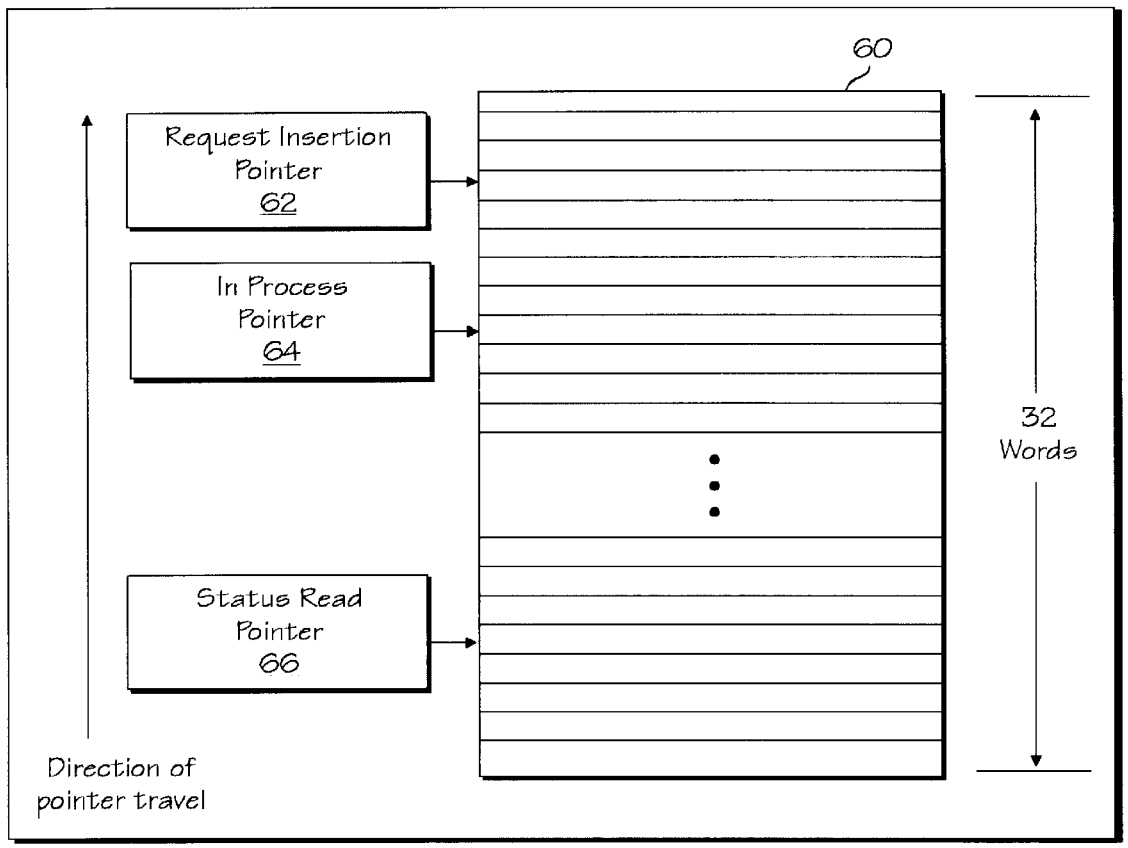
FIG. 11 shows the request/status circular queue for an ATM cell processing unit according to one embodiment.

FIG. 11 shows the Request/Status Circular Queue 60 and the three pointers that are associated with it. Requests for segmentation or reassembly are written into the queue 60 at the location specified by the Request Insertion Pointer 62, and then the pointer is incremented. When the RISC processor 22 reads status, the word present at the Status Read Pointer 66 is accessed and sent to the RISC processor 22, and the pointer is then incremented. The In Process Pointer 64 points to the request that is currently being processed; when the processing is complete, the appropriate status information is written into the word and the pointer is then incremented to access the next request. The pointers are utilized internally by the cell processing unit 12 and can not be accessed by external devices.

The following information can be gleaned from the relationships of the pointers. If the Request Insertion Pointer 62 is pointing to the same location as the In Process Pointer 64, there are no requests currently being processed. If the Status Read Pointer 66 is pointing to the same location as the In Process Pointer 64, there are no completed status words waiting to be read; a read from the queue 60 by the RISC processor 22 in this situation will return a "Not Done" status for the request that is currently in process and the Status Read Pointer 66 is not incremented. If all three pointers are pointing to the same location, there are no requests currently being processed and there are no completed status words waiting to be read.

Figure 12:
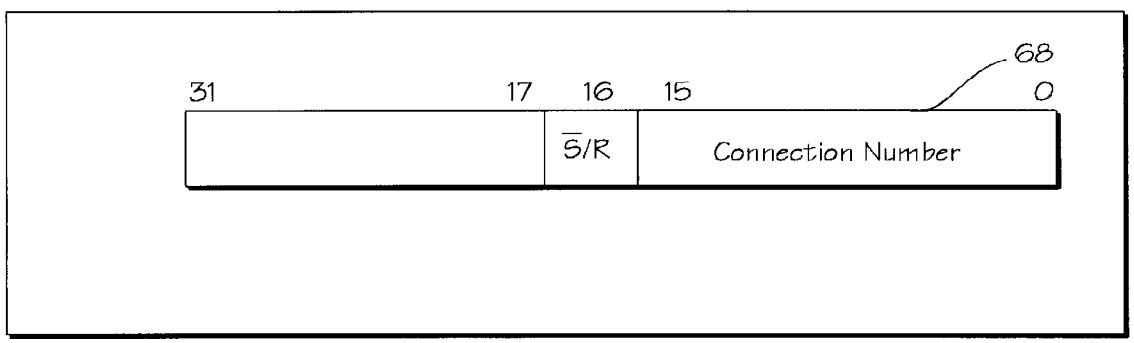
FIG. 12 shows a segmentation and reassembly request format according to one embodiment.

A single register, the SAR Activity Register 68, in the SAR unit 20 is utilized for writing SAR requests and reading SAR status. The SAR Activity Register 68 is one of the working registers 51 shown in FIG. 3. SAR requests written to the SAR Activity Register 68 have the format shown in FIG. 12. Bits 0–15 of the SAR request specify the connection number. Bit 16 (S/R) will be set to 0 for a segmentation request and will be set to 1 for a reassembly request. Bits 17–31 are reserved and are set to 0 in the request.

Figure 13:
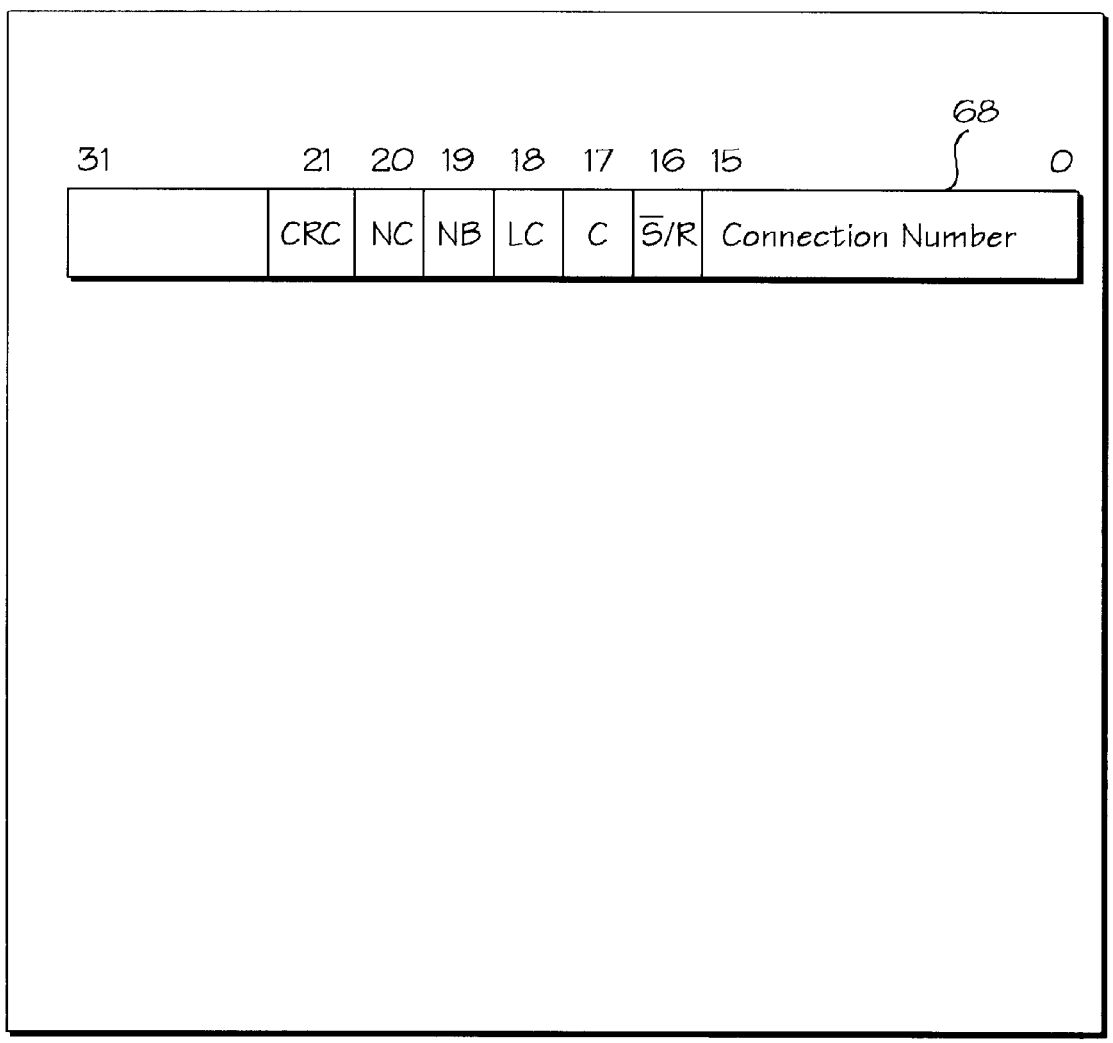
FIG. 13 shows a segmentation and reassembly status format according to one embodiment.

The SAR status returned when a read is done from the SAR Activity Register 68 has the format shown in FIG. 13. Bits 31–22 are reserved and will be returned as all 0s. Bit 21, shown as CRC, is used to indicate CRC errors. If the last cell 70 in the frame was processed and a CRC mismatch detected, this will return set to 1. Bit 20, NC, is the "no cell" bit. If it returns set to 1, this is an indication that the External Cell Buffer Pointer 83 for the connection was marked as Not Valid. Bit 19, the "no buffer" (NB) bit, will return set to 1 if there was no buffer available to process the request. Bit 18, the "last cell" (LC) bit, will return set to 1 if the current request caused the processing of the last cell in the frame for the current connection. Bit 17, the "connection bit" (C), will return set to 0 if the processing of the current request has not been completed. If set to 1, this is an indication that the current request has been completed and the request will be removed from the queue upon completion of the status read. Bit 16 (S/R) is set to 0 if the current request is a segmentation request and is set to 1 if the current request is a reassembly request. Bits 0–15 indicate the connection number.

The segmentation function of SAR unit 20 will generate a cell 70 for a particular connection when it is requested to do so by the RISC processor 22. The RISC processor 22 makes the request for a cell by writing the request and connection number into the Request/Status Circular Queue 60. The connection number is 16 bits in length, hence the segmentation function will support up to 64K different connections. The process by which a cell 70 is assembled is described below.

When a cell 70 is completed, the completion status for that cell is placed in the Request/Status Circular Queue 60 where it can then be read by the RISC processor 22. If the RISC processor 22 attempts to read from the Request/Status Circular Queue 60 when it is empty, a "Not Done" status will be returned for the next connection number to be processed.

When a request is received for cell generation, the segmentation function uses the connection number contained in the request to calculate an address for the associated entry 41 in the connection table 40. The address calculation combines the value of the Connection Table Base Address Register 55, the connection number multiplied by 64 (i.e., left-shifted 6 bits), and the offset for the desired word in the entry. The address calculation is performed in the address mux 56 (FIG. 3).

If no exception conditions (address invalid, end of buffer, end of frame, etc.) are encountered, the generation of a cell 70 by the segmentation function involves the following steps. First, the SAR unit 22 reads the current control and state information. Next, the SAR unit 22 reads the four Header Words 71–74 from the connection table entry 41 and places them at the beginning of the internal cell buffer 50. The SAR unit 20 then resets the LC Bit in Header Word 4 of the Internal Cell Buffer 50 to 0, indicating this is not the last cell 70 in the frame. The SAR unit 20 then reads the partial CRC-32 75, the Frame Length 78, and the Transmit Buffer Length 81 from connection table entry 41. The Transmit Buffer Pointer 79 is read to get the beginning address of the data to be placed in the cell 70. The SAR unit 20 then reads the first 48 bytes (12 words) from the transmit buffer 42 and places them in the Internal Cell Buffer 50; the partial CRC-32 75 is updated as the data is read. Finally, the Internal Cell Buffer 50 and the Destination Mailbox Number 82 are sent to the bus controller 30 for transmission.

After the first cell 70 is transmitted, the SAR unit 20 writes the new value of Transmit Buffer Pointer (old value+ 48 bytes), the new value of Frame Length (old value+48 bytes), the new value of Transmit Buffer Length (old value– 48 bytes), the updated partial CRC-32, and the updated control and state information to the connection table entry 41 and writes the completion status to the Request/Status Circular Queue 60. Finally, the SAR unit 20 reads the next request from Request/Status Circular Queue 60 and repeats the above steps for the next connection.

The sequence of steps described above is altered when the transmit buffer 42 is empty (Transmit Buffer Length 81 is 0) at the start of cell processing or if the transmit buffer 42 is consumed (Transmit Buffer Length 81 is <48) while processing the cell 70. The action taken depends on the value of the Last Buffer (LB) Bit and the NV Bit in Word n−1 of the transmit bufffer 42 (refer to FIG. 7) as follows.

If LB=0, NV=0: This is not the last buffer, and the Next Buffer Pointer is valid. The buffer 42 is chained to the next buffer 42 as follows: First, Word n−1 of the buffer 42 (including the LB and NV Bits) is copied to the Transmit Buffer Pointer 79 of the connection table entry 41. Next, Word n of the buffer 42 is read and the Next Buffer Size field (the low order 16 bits) is copied into the Transmit Buffer Length 81 of the connection table entry 41. Then, Word n of the buffer 42 is written back with the BP (Buffer Processed) Bit set to 1. Finally, cell processing continues for the new buffer 42.

If LB=0, NV=1: This is not the last buffer, but the Next Buffer Pointer is invalid. In this case, the steps shown above (for LB=0, NV=0) are followed. However, when cell processing continues and the new Transmit Buffer Pointer 79 is read, the segmentation function will detect that the NV Bit is set. An entry will be placed in the Request/Status Circular Queue 60 indicating a "No Buffer" error; the connection table entry 41 is not updated and no cell 70 is sent on the switch bus 14.

If LB=1, NV=X: This is the last buffer 42 for the frame. The frame is closed out as follows: First, the last cell(s) 70 for the frame are generated. Then, Word n−1 of the buffer 42 (including the LB and NV Bits) is copied to the Transmit Buffer Pointer 79 of the connection table entry 41; if this is an invalid address (NV=1), it will be detected when a new cell 70 for this connection is processed. Next, Word n of the buffer 42 is read and the Next Buffer Size field (the low order 16 bits) is copied into the Transmit Buffer Length 81 of the connection table entry 41. Then, the Frame Length field 78 in the connection table entry 42 is set to 0 and the Control field 80 is updated. Next, the CRC-32 field 75 in the connection table entry 41 is reinitialized to all is and the "Last Cell Complete" status is written to the Request/Status Circular Queue 60. Finally, the next request is read from Request/Status Circular Queue 60 and the above steps are repeated for the next connection.

The reassembly function gathers 48-byte cells into one or more larger receive buffers 44 while performing the CRC-32 check on the data. A cell 70 is processed by the reassembly function of SAR unit 20 when the RISC processor 22 writes the request and connection number into the Request/Status Circular Queue 60. The connection number is 16 bits in length, hence the reassembly function will support up to 64K different connections.

When a cell 70 is completed, the completion status for that cell is placed in the Request/Status Circular Queue 60 where it can then be read by the RISC processor 22. If the RISC processor 22 attempts to read from the Request/Status Circular Queue 60 when it is empty, a "Not Done" status will be returned for the next connection number to be processed.

If no exception conditions (address invalid, end of buffer, etc.) are encountered, the processing of a cell by the reassembly function involves the following steps. First, the SAR unit 20 reads the current control and state information. Next, the SAR unit 20 reads the External Cell Buffer Pointer 83 from the connection table entry 41. The Header Words from the external cell buffer 46 (the only information retained from the header words is the Last Cell Bit which is bit 1 of Header Word 4) are then read, followed by a read of the 48-bytes of payload from the external cell buffer 46 to the internal cell buffer 50. The SAR unit 20 updates the CRC-32 as data is being read. Next, the SAR unit 20 reads the Next Cell Pointer and NV Bit from the external cell buffer 46 and stores it in the connection table entry 41 as the new External Cell Buffer Pointer 83 and NV Bit (if the NV Bit is set, no action is taken during this step, rather an exception will occur the next time the External Cell Buffer Pointer 83 is read). The SAR unit 20 then reads the Receiver Buffer Pointer 84 from the connection table entry 41 and writes the 48-bytes of payload data present in the internal cell buffer 50 to the receive buffer 44, starting at the location specified by Receive Buffer Pointer 84 (note that a new buffer 44 may first have to be obtained as described below). The SAR unit 20 then writes new values of the Receiver Buffer Pointer 84 (old value+48 bytes) and the Receiver Buffer Length 86 (old value+48 bytes) to the connection table entry 41.

One exception condition that can occur during the above processing is if the External Cell Buffer Pointer 83 is not valid (NV Bit=1) when it is read from the connection table entry 41. In this case, no processing occurs and a "No Cell" error is placed in the Request/Status Queue 60 to be read by the RISC processor 22.

Another exception occurs when a new receive buffer 44 must be allocated from the Free Buffer List. There are two conditions which will cause this exception. The conditions and steps taken in response to those conditions are described below.

Condition 1 occurs when the Receive Buffer Pointer 84 is marked as invalid (NV=1) when it is read from the connection table entry 41. This is the condition that exists after initialization by software. In this case, the SAR unit 20 copies the contents of the Free Buffer Pointer Reg. 53 into the Receiver Buffer Pointer 84 in the connection table entry 41. If the NV Bit is set in the Free Buffer Pointer, a "No Buffer" error is placed in the Request/Status Circular Queue 60 to be read by the RISC processor 22 and no further processing occurs. The SAR unit 20 copies the contents of the Buffer Size Reg. 54 into the Receive Buffer Length field 86 of the connection table entry 41. The contents of the Free Buffer Pointer Reg. 53 are also copied into the Head Buffer Pointer 88 and the contents of the Free Buffer Pointer Reg. 53 and the Buffer Size Reg. 54 are added together. The result is the address of the last word in the buffer 44 which holds the Next Buffer Pointer and the NV Bit. Then, the Next Buffer Pointer and NV Bit are copied to the Free Buffer Pointer Reg. 53.

Condition 2 occurs when the Receiver Buffer Pointer 84 is valid (NV=0) but the Receive Buffer Length 86 is 0, indicating that the buffer has been filled with frame data. In this case, the Receive Buffer Pointer 84 is now pointing at Word n−1 of the buffer 44 (refer to FIG. 8). The processing in this case is very similar to Condition 1, as follows. First, the contents of the Free Buffer Pointer Reg. 53, with the Ownership Bit (OB) (Bit 0) set to 1, are copied to Word n−1 of the buffer 44 (where the Receive Buffer Pointer 84 is pointing). This is the new buffer into the existing buffer chain. Next, setting the Ownership Bit to 1 changes ownership of the buffer from hardware to software. Finally, all the steps described for Condition 1 above are performed except setting the head pointer.

When processing the last cell 70 in a frame, all of the information in the cell 70 is copied to the receive buffer 44, including any padding and the 8 bytes of trailer information at the end of the cell. After this processing is complete, the CRC-32 is checked and a status message for the entire frame is placed in the Request/Status Circular Queue 60 to be read by the RISC processor 22.

After the first cell 70 for a frame has been processed and moved to a receive buffer 44, the buffer is "closed out" via the following steps. First, the Receive Buffer Pointer 84 and Receive Buffer Length 86 fields from the connection table entry 41 are added together; the sum is a pointer that is pointing to Word n−1 of the receive buffer 44 (refer to FIG. 8). Next, the pointer produced in the previous step is incermented so that it is now pointing at Word n of the receive buffer 44. The SAR unit 20 then writes the Receive Buffer Length 86 (which is actually the remaining buffer length) in the low order 16 bits of Word n and sets the LB Bit to 1, indicating this is the last buffer in the frame. Finally, the connection table 40 for this connection is updated by setting the Receive Buffer Length field 86 to 0 and initializing the CRC field 87 to all ones.

The segmentation and reassembly functions described above are performed at opposite ends of a cell transfer across switch bus 14. That is, one cell processing unit 12 will cary out the segmentation function to prepare cells 70 for transfer. Once the transfer is complete, another cell processing unit 12 will perform the reassembly function to assemble the cells 70 into a frame. (Note, in some cases, the transfer might involve the same cell porcessing unit that performed the cell segmentation function, e.g., when cells are being transferred between ports associated with the same cell processing unit 12.) The manner in which cells are transmitted across switch bus 14 is described below.

III. Mailboxes

Figure 14:
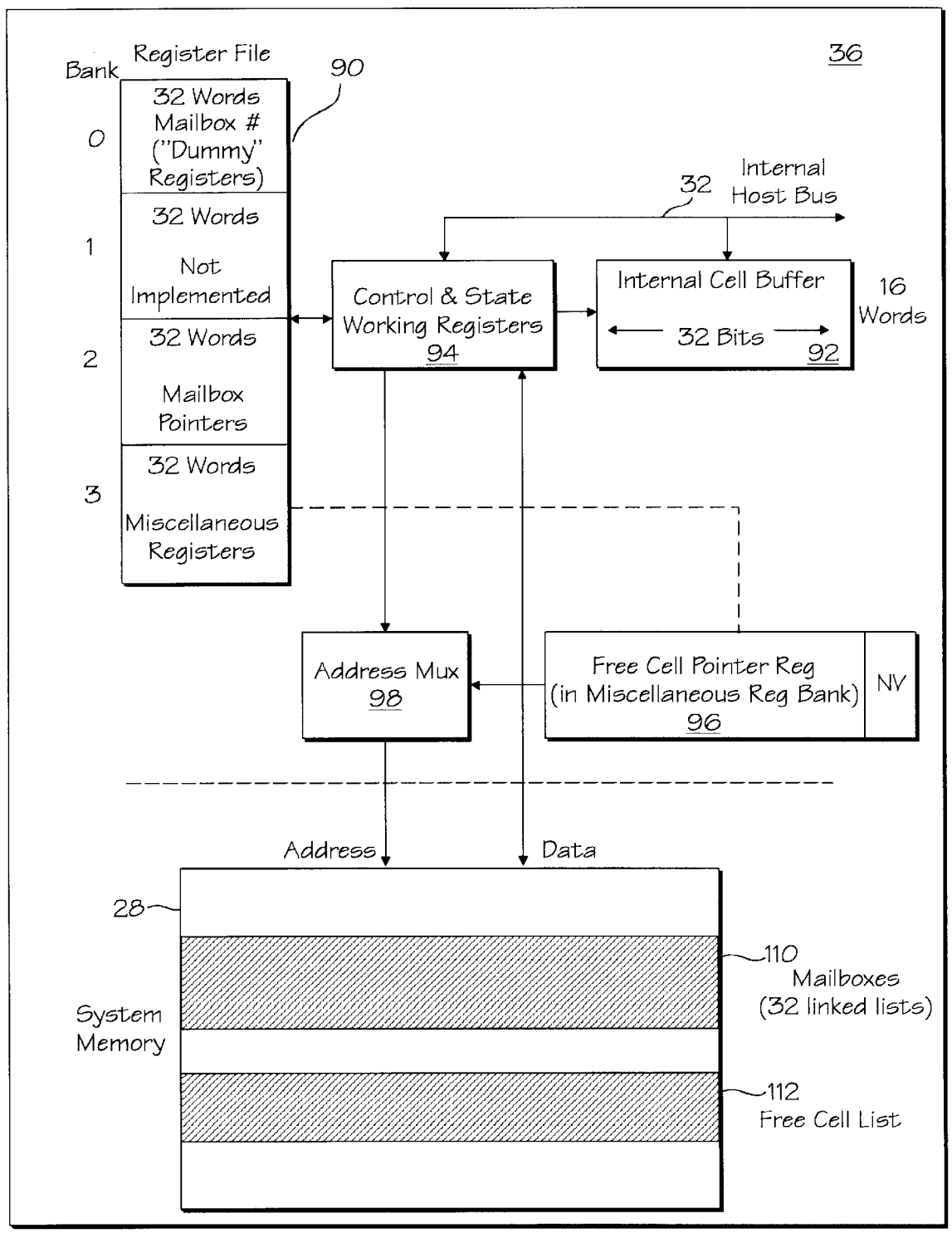
FIG. 14 shows a typical mailbox function block diagram for an ATM cell processing unit according to one embodiment.

Each cell processing unit 12 includes an interface and mailbox unit 36 with associated data structures. The interface section of interface and mailbox unit 36 provides the bidirectional paths necessary for inter-processor communications while the mailbox section's task is to transfer 64-byte cells received from the switch bus 14 to system memory 28. A block diagram of the interface and mailbox unit 36 of the ATM cell processing unit 12 is shown in FIG. 14.

Residing in the interface and mailbox unit 36 is the Internal Register File 90 which contains the registers used by the mailbox function, as well as the miscellaneous registers that are used by each of the major functional blocks. The Internal Register File 90 is divided into 4 banks as shown in Table 2; the miscellaneous registers are enumerated in Table 3.

TABLE 3

Miscellaneous Registers

| Word Offset From Base of Bank 3 | Register Name | R/W |
|---|---|---|
| 0 | Mailbox Free Cell Pointer Register | |
| 1 | Mailbox Control Register | |
| 2 | Mailbox Accessed Interrupt Register | |
| 3 | Activity Register | |
| 4 | Configuration Address Register | |
| 5 | Configuration Data Register | |
| 6, 7 | Reserved | |
| 8 | Configuration Space Base Address Register 0 | |
| 9 | Configuration Space Base Address Register 1 | |
| 10 | Configuration Space Base Address Register 2 | |
| 11 | Configuration Space Base Address Register 3 | |
| 12 | Configuration Space Base Address Register 4 | |
| 13 | Configuration Space Base Address Register 5 | |
| 14, 15 | Reserved | |
| 16 | Reassembly Free Buffer Pointer Register | |
| 17 | Reassembly Free Buffer Length Register | |
| 18 | Connection Table Base Pointer Register SAR Control Register | |
| 20–30 | Reserved | |
| 31 | SAR Request/Status Register | |

Mailboxes 110 are used within the ATM cell processing unit 12 as destinations for cell transfers across the switch bus 14. Each ATM cell processing unit 12 in the switch 10 has 32 mailboxes 110. All mailboxes 110 within a switch 10 have unique addresses within the system address space so that any ATM cell processing unit 12 can send cells 70 directly to any mailbox 110 on any ATM cell processing unit 12 (including to mailboxes 110 on the same ATM cell processing unit 12).

The mailboxes 110 are address locations within system memory 28, and are implemented as linked lists of cells. Note that there is no correlation between connection numbers and mailbox addresses. The mailbox address only specifies which linked list the incoming cell 70 should be added to. The ATM cell processing unit 12 does not assign any special meaning to any mailbox address, rather it leaves this task to software. Software may choose, for example, to assign different processing priorities to different mailboxes 110 on trunk processing units, or may choose to assign a

TABLE 2

Internal Register File Banks

| Bank | Description |
|---|---|
| 0<br>A8, A7 = 00 | Defines the transfer as being directed to a mailbox. The actual mailbox number is contained in A6 . . . A2. The 32 registers in this address space are "dummy" registers, i.e., there are no actual physical registers present in this space. |
| 1<br>A8, A7 = 01 | There are no registers present in this address space. This space should not be used for any purpose. |
| 2<br>A8, A7 = 10 | These are the 32 Mailbox Pointer Registers. Each register contains an address that points to the beginning of the next cell to be used for a transfer to the corresponding mailbox. |
| 3<br>A8, A7 = 11 | Miscellaneous registers. These are defined in Table 3. |

There is also a transfer function which reads a 16 work cell, a link to the next cell, and a mailbox# from an 18 word buffer and sends the 16 word to the mailbox# then if the link is valid goes onto the next cell.

mailbox 110 to each port on a port processing unit. Note that various cell processing units 12 may perform different functions within switch 10. For example, one cell processing unit 12 might act as a trunk processing unit while another cell processing unit 12 might act as a port processing unit.)

Even though there are 32 mailboxes 110 on each ATM cell processing unit 12, there is no requirement that all 32 be used.

The transfer of a cell 70 to the interface and mailbox unit 36 is initiated by the bus controller 30 over the internal host bus 32. The mailbox function utilizes the Internal Register File 90 (refer to FIG. 14) during the transfer. Address bits 8 and 7 of the transfer address access one of the four banks of the register file 90; bits 6 through 2 specify one of the 32 32-bit registers in the space. The transfer address is the address asserted on switch bus 14 by the cell processing unit which is sending the call. As discussed above, the transfer occurs as part of a PCI burst transfer.

Figure 15:
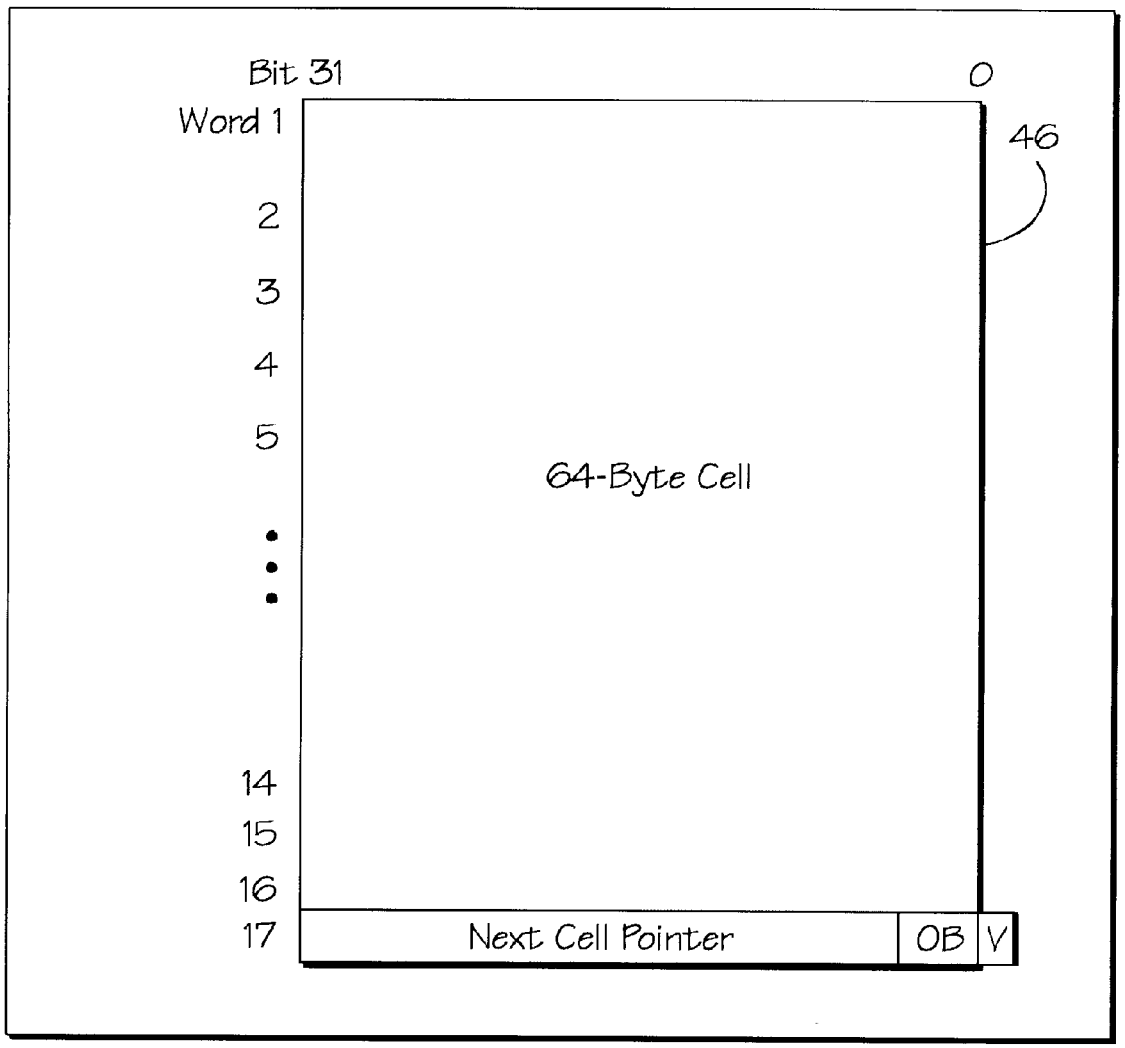
FIG. 15 shows a cell buffer in a mailbox linked list according to one embodiment.

During the processing of mailbox transfer requests, the ATM cell processing unit 12 must obtain empty cell buffers 46 from the Free Cell List 112. The Free Cell Pointer Register 96 contains the address of the first cell 70 at the top of this linked list. After the cell buffer 46 is obtained from the Free Cell List 112, it is linked into the list for the corresponding mailbox 110. The cell buffers 46 in the Free Cell List 112 have the format shown in FIG. 9. Once it has been linked into the mailbox linked list, the cell buffer 46 has the format shown in FIG. 15.

When the mailbox function recognizes the transfer as being directed to an address within the Miscellaneous Registers area of register file 90, it stores bits 8 through 2 of the address in working registers 94 and stores the cell 70 in its internal buffer 92. If address bits 8 and 7 indicate that this is a mailbox access, the following steps are then taken to process the transfer request for the mailbox 110 indicated in address bits A6–A2 (referred to below as the "current" mailbox).

First, the mailbox unit 36 transfers the 64 bytes of data from the internal cell buffer 92 to an external cell buffer 46. The external cell buffer 46 is pointed to by the Mailbox Pointer Register in register file 90 for the current mailbox. The mailbox unit 36 then copies the contents of the Free Cell Pointer Register 96, with Bit 1 set to 1, into Word 17 of the external cell buffer 46. This links the next available cell at the end of the current mailbox linked list; setting Bit 1 to 1 marks the current cell as being owned by software. The mailbox unit 36 then copies the contents of the Free Cell Pointer Register 96 into the Mailbox Pointer Register of register file 90 for the current mailbox 110. The Mailbox Pointer Register now points at the available cell just added at the end of the linked list for the current mailbox. Then, the mailbox unit 36 adds 64 to the Free Cell Pointer Register 96; the sum is the address of Word 17 of the cell buffer that is still at the top of the Free Cell List 112 (but which is about to be removed because it has been added to the lined list for the current mailbox). From Word 17, the mailbox unit 36 reads the Next Cell Pointer and NV Bit of cell buffer 46 and copies them into the Free Cell Pointer Register 96. The Free Cell Pointer now points to the new top of the Free Cell List 112.

IV. Interprocessor Communication

As indicated above, for a preferred embodiment, the ATM cell processing units 12 in a switch 10 communicate with each other over a backplane (switch bus 14) using the PCI bus protocol. An ATM cell processing unit 12 can perform two types of access on the PCI bus 14, configuration space accesses and memory accesses. Configuration space contains a set of registers that are required by the PCI Specification and another set of registers that are optional. The registers that are used within the PCI bus configuration space in a switch 10 are shown in Table 4.

TABLE 4

PCI Configuration Space Registers

| Offset From Configuration Space Base Address | 31 | 24 | 23 | | 16 | 15 | | 8 | 7 | 0 |
|---|---|---|---|---|---|---|---|---|---|---|
| 0x00 (R) | | Device ID | | | | | ID Vendor | | | |
| 0x04 (R) | | Status | | | | | Command | | | |
| 0x08 (R) | | Class Code | | | | | | Revision | | |
| 0x0C (R) | BIST | Header Type | | | Latency Timer | | | Cache Line Size | | |
| 0x10 (R) | Base Address Register 0 (Not Used) | | | | | | | | | |
| 0x14 (R) | Base Address Register 1 (Board Address) | | | | | | | | | |
| 0x18 (R) | Base Address Register 2 (Not Used) | | | | | | | | | |
| 0x1C (R) | Base Address Register 3 (Not Used) | | | | | | | | | |
| 0x20 (R) | Base Address Register 4 (Not Used) | | | | | | | | | |
| 0x24 (R) | Base Address Register 5 (Port Processor External Memory/Registers) | | | | | | | | | |
| 0x28 (R) | Reserved | | | | | | | | | |
| 0x2C (R) | Reserved | | | | | | | | | |
| 0x30 (R) | Boot Base Address Register | | | | | | | | | |
| 0x34 (R) | Reserved | | | | | | | | | |
| 0x38 (R) | Reserved | | | | | | | | | |
| 0x3C (R) | Max_Lat | Min_Gnt | | | Interrupt Pin | | | Interrupt Line | | |
| 0x5C (O) | Reset Reg | Bus Number | | | General Reg. | | | | | |

Figure 16:
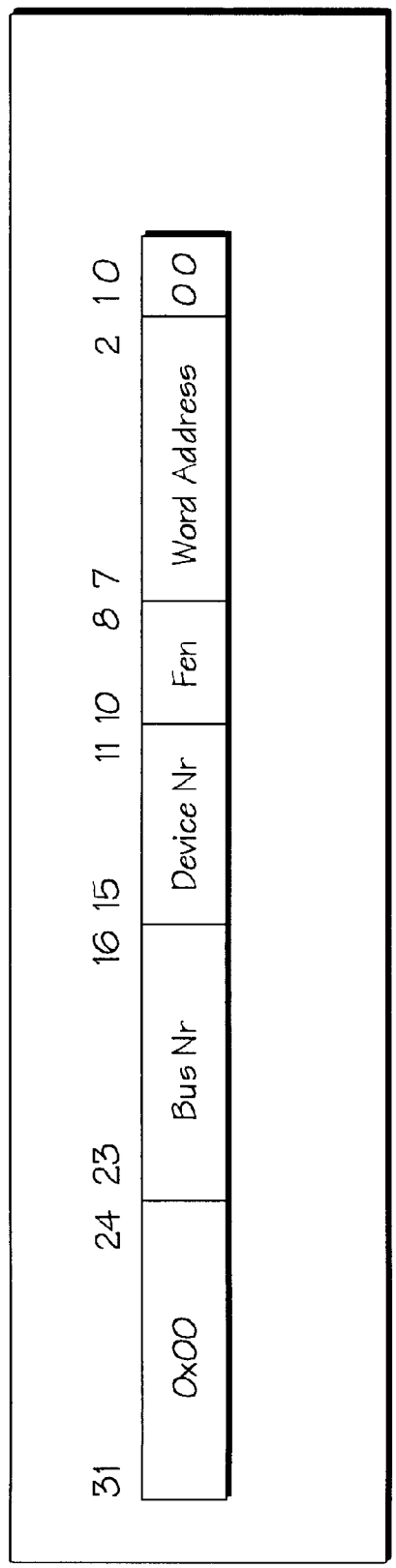
FIG. 16 shows a configuration address register according to one embodiment.

R: Required Register in the PCI Specification;
O: Optional Register in the PCI Specification Each ATM cell processing unit 12 has its own configuration space, and any ATM cell processing unit 12 in the switch 10 can access any cell processing unit's configuration space, including its own. To access configuration space, the port control processor 36 first loads an address into the configuration address register 100. (The configuration address register 100 is located in the miscellaneous registers, see Table 3 and FIG. 14.) The format of the configuration address register 100 is shown in FIG. 16.

Within configuration space, there are two types of accesses that can occur, type 0 which is a local access and type 1 which is a remote access. "Local" refers to an access on the same PCI bus, while "remote" refers to an access across a PCI bridge to another bus. For a single switch 10, all accesses should be local accesses. However, each ATM cell processing unit 12 is designed to support remote accesses if required. A type 0 local access occurs when the Bus Number field of the configuration address register 100 (FIG. 16) matches the Bus Number Register in the PCI Configuration Space (Table 4, offset 0x5D); if the two do not match, a type 1 remote access occurs.

The Device Number field of the configuration address register 100 is used to address an ATM cell processing unit 12 within the switch 10 during a configuration space access. ATM cell processing unit 12 numbers are 0 relative. The ATM cell processing unit 12 provides the capability to address 21 cell processing units. For a local access, the Device Number field is not placed directly onto the PCI bus 14, but is converted to the "1-hot" ID Select lines required by the PCI bus 14 during a configuration space access. The ID Select lines are mapped onto the PCI bus address lines as shown in Table 5.

TABLE 5

| Device Number | PCI Address Bus Bits 31 ... 11 | Cell Processing Unit With ID Select Line Asserted |
|---|---|---|
| 0x00 | 000000000000000000001 | 0 |
| 0x01 | 000000000000000000010 | 1 |
| 0x02 | 000000000000000000100 | 2 |
| 0x03 | 000000000000000001000 | 3 |
| 0x04 | 000000000000000010000 | 4 |
| 0x05 | 000000000000000100000 | 5 |
| 0x06 | 000000000000001000000 | 6 |
| 0x07 | 000000000000010000000 | 7 |
| 0x08 | 000000000000100000000 | 8 |
| 0x09 | 000000000001000000000 | 9 |
| 0x0A | 000000000010000000000 | 10 |
| 0x0B | 000000000100000000000 | 11 |
| 0x0C | 000000001000000000000 | 12 |
| 0x0D | 000000010000000000000 | 13 |
| 0x0E | 000000100000000000000 | 14 |
| 0x0F | 000001000000000000000 | 15 |
| 0x10 | 000010000000000000000 | 16 |
| 0x11 | 000100000000000000000 | 17 |
| 0x12 | 001000000000000000000 | 18 |
| 0x13 | 010000000000000000000 | 19 |
| 0x14 | 100000000000000000000 | 20 |
| 0x15–0x1F | 000000000000000000000 | None |

Thus, an ATM switch based on an integrated bus has been described. In the foregoing specification, the invention has been described with reference to specific exemplary embodiments thereof. It will, however, be appreciated that various modifications and changes can be made thereto without departing from the broader spirit and scope of the invention as set forth in the appended claims. The specification and drawings are, accordingly, to be regarded as an illustrative rather than a restrictive sense.

We claim:

1. An ATM switch comprising:
 a plurality of cell processing units each configured to transfer ATM cells between one another and each having a host bus, a segmentation and reassembly (SAR) unit coupled to the host bus, a reduced instruction set (RISC) processor coupled to the host bus, a memory coupled to the host bus and a bus controller; and
 an integrated switch bus coupling the cell processing units to one another and configured to support the transfer of cells and control information between the cell processing units,
 wherein the segmentation and reassembly units of the cell processing units each comprise:
  a circular queue coupled to the host bus;
  a plurality of registers coupled to the host bus; and
  a cell buffer coupled to the host bus.

2. The ATM switch of claim 1 wherein each of the bus controllers of the cell processing units comprise Gunning Transceiver Logic drivers and receivers, the drivers and receivers for interfacing with the integrated system bus.

3. The ATM switch of claim 1 wherein each of the memories of the cell processing units stores a connection table, the connection table comprising a plurality of entries, each of the entries including cell header information and cell segmentation and reassembly information.

4. The ATM switch of claim 1 wherein the integrated system bus comprises a Peripheral Component Interconnect (PCI) bus.

5. The ATM switch of claim 4 further comprising a bus arbiter coupled to the integrated system bus and configured to communicate with each of the cell processing units to grant or deny access to the integrated system bus.

6. A method of transferring data within an ATM switch comprising the steps of:
 requesting a first connection at a first cell processing unit of the ATM switch, the first connection being specified by a first connection number;
 assembling a first ATM cell in the first cell processing unit;
 transmitting the first cell to a destination address associated with a second cell processing unit of the ATM switch, the transmission taking place across an integrated switch bus coupling the first and second cell processing units and configured to support cell exchanges and control information exchanges between the first and second cell processing units; and
 receiving the first cell at the second cell processing unit wherein the step of assembling includes the steps of:
  using the first connection number to index a first connection table stored in a first memory of the first cell processing unit, the first connection table comprising a plurality of entries, each of the entries comprising cell header information, a transmit buffer pointer and a mailbox address;
  copying the cell header information in a first connection table entry indexed by the connection number into a first cell register of the first cell processing unit;
  using the transmit buffer pointer in the first connection table entry to index a corresponding first transmit buffer, the first transmit buffer being a plurality of address locations within the first memory, the first transmit buffer storing a plurality of payload data bytes to be transmitted; and
  copying the plurality of payload data bytes in the first transmit buffer into the first cell register.

7. The method of claim 6 wherein the step of transmitting includes the steps of:
 retrieving the mailbox address from the first connection table entry;
 transferring the mailbox address to a bus controller of the first cell processing unit, the bus controller being coupled to the integrated switch bus and the first cell register;
 transmitting the mailbox address on the integrated switch bus, the mailbox address associated with a memory location within the second cell processing unit;
 transmitting the cell header information and the payload data bytes from the first cell register to the bus controller; and
 transmitting the cell header information and the payload data bytes from the bus controller to the memory location associated with the mailbox address.

8. The method of claim 7 wherein the step of receiving the first cell at the second processing unit comprises:
 decoding the mailbox address transmitted by the first cell processing unit;
 storing the first cell within an internal cell register of the second cell processing unit; and
 transferring the first cell from the internal cell register to an external cell register, the external cell register being within the first memory of the second cell processing unit.

9. A computer implemented method of reassembling cells within an ATM switch having an integrated switch bus supporting cell exchanges and interprocessor communication and a plurality of ATM cell processing units, including a first cell processing unit, the first cell processing unit having a memory and a cell register, the cell processing units coupled to the integrated switch bus, the method comprising the steps of:

requesting a cell reassembly at the first cell processing unit, the cell reassembly being specified by a connection number;

using the connection number to index a connection table stored in the memory of the first cell processing unit, the connection table comprising a plurality of entries, each of the entries comprising cell header information, a receive buffer pointer and an external buffer pointer;

copying the cell header information in a first connection table entry indexed by the connection number into the cell register;

using the external buffer pointer in the connection table entry to index a corresponding external buffer, the external buffer being a plurality of address locations within the memory, the external buffer storing a plurality of payload data bytes; and copying the plurality of payload data bytes in the external buffer into the first cell register; and transferring the cell header information and the payload data from the first cell register to a receive buffer, the receive buffer being with the memory, the receive buffer being identified by the receive buffer pointer in the connection table entry.

10. In an electronic communication system, a computer implemented method of transmitting data packets on a peripheral component interconnect (PCI) bus by a first node of the bus, the first node having a memory, a transmit buffer and a cell buffer, the method comprising the steps of:

assembling a first ATM cell at the first node, the first ATM cell comprising header information and payload information;

transmitting the first ATM cell from the first node to a destination node using a burst transfer across the PCI bus; and receiving the first ATM cell at the destination node, wherein the step of assembling the first ATM cell comprises;

indexing a connection table stored in the memory, the connection table comprising a plurality of entries, each entry comprising cell header information and cell segmenting information;

copying the cell header information in a first connection table entry into the cell buffer;

using the segmenting information in a first connection table entry to access the transmit buffer; and copying cell payload data stored in the transmit buffer into the cell buffer.

\* \* \* \* \*